Figure 1:
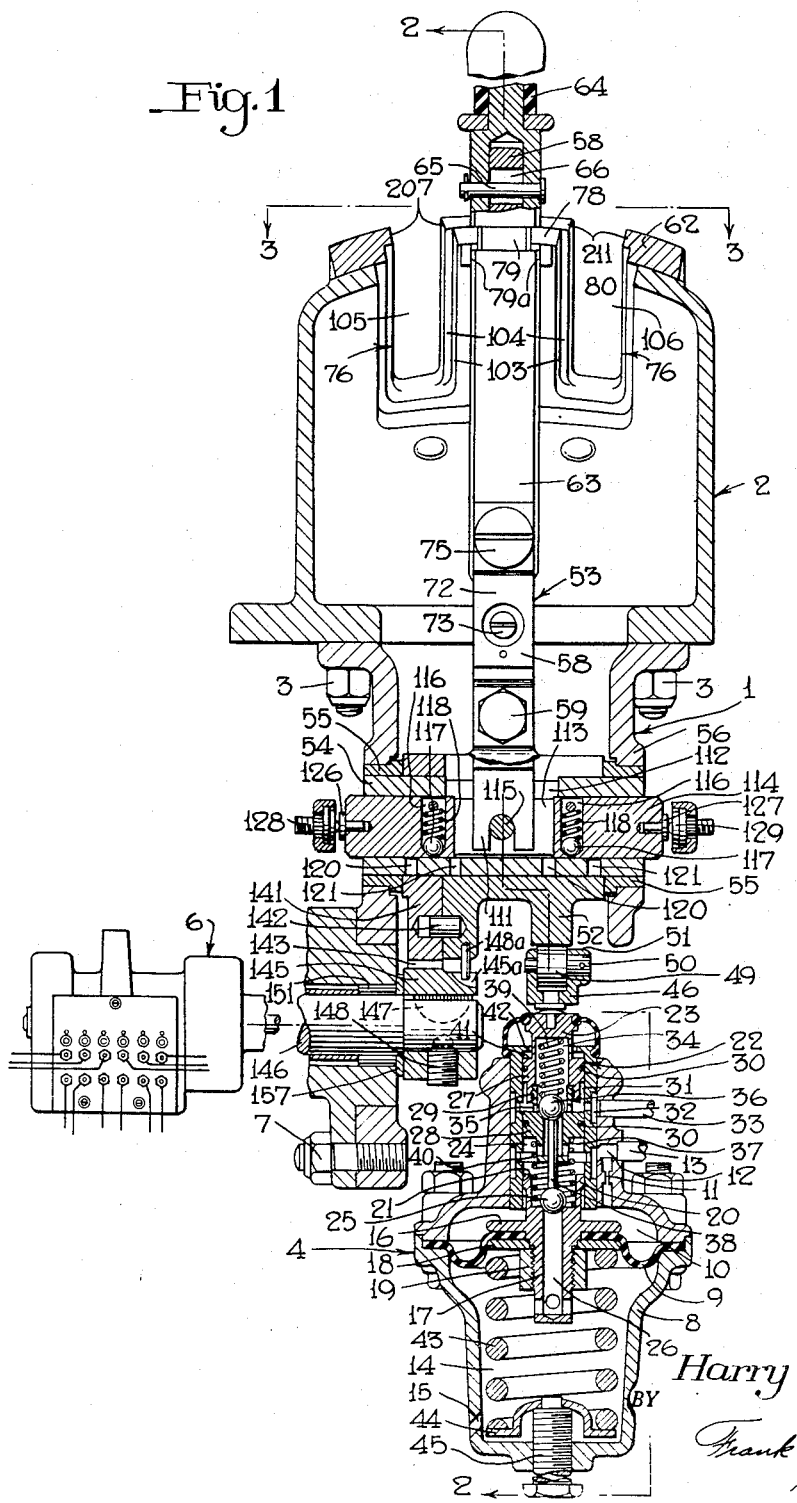

Jan. 26, 1954  H. C. MAY  2,667,247
POWER AND BRAKE CONTROLLER
Original Filed June 29, 1950  5 Sheets-Sheet 1

INVENTOR.
Harry C. May
BY
Frank E. Miller.
ATTORNEY

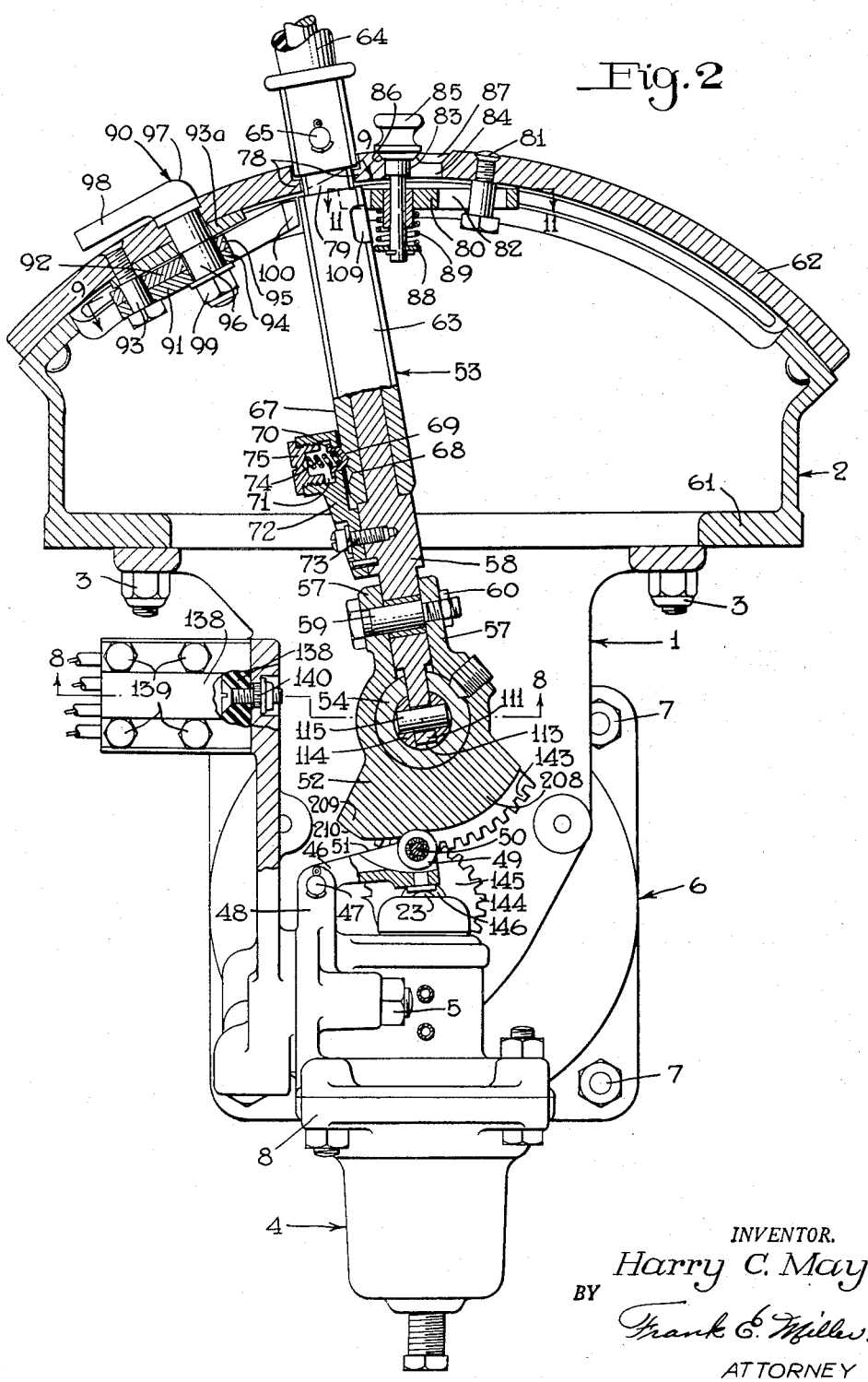

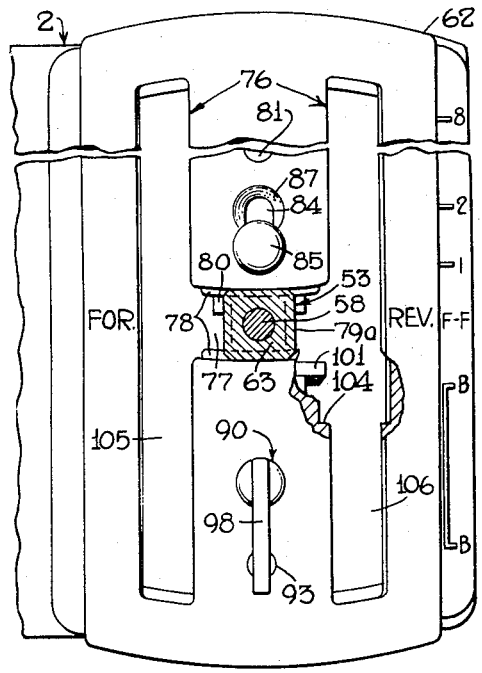
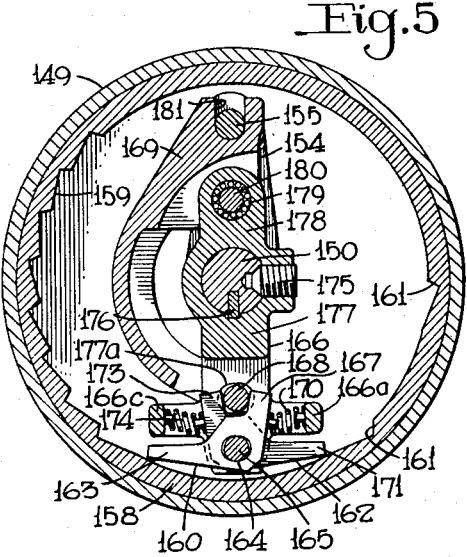
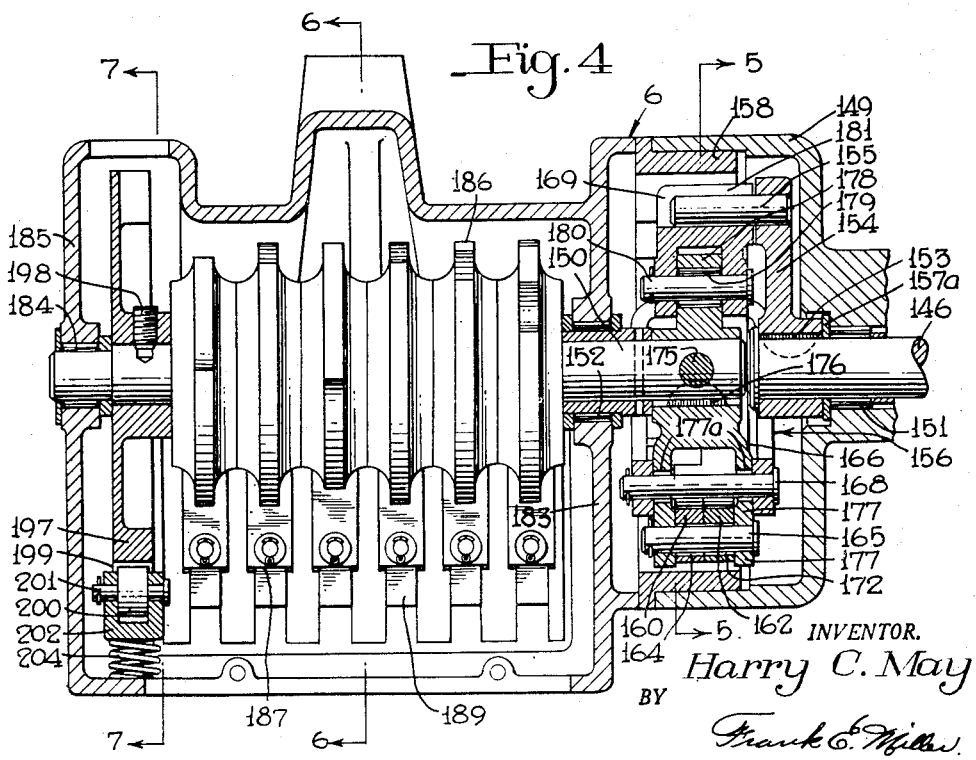

Jan. 26, 1954 H. C. MAY 2,667,247
POWER AND BRAKE CONTROLLER
Original Filed June 29, 1950 5 Sheets-Sheet 4

INVENTOR.
Harry C. May
BY
Frank E. Miller
ATTORNEY

Jan. 26, 1954 H. C. MAY 2,667,247
POWER AND BRAKE CONTROLLER
Original filed June 29, 1950 5 Sheets-Sheet 5
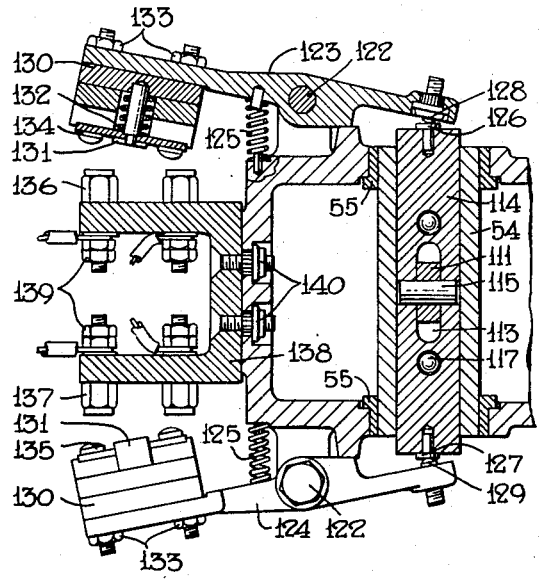
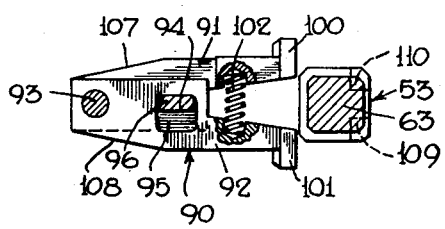
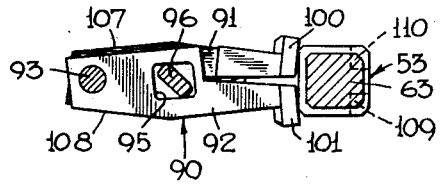
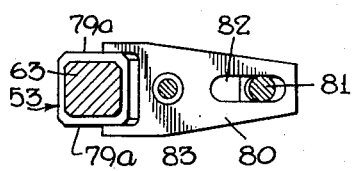
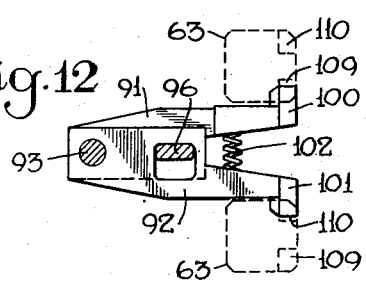
INVENTOR.
Harry C. May
BY
Frank E. Miller
ATTORNEY Patented Jan. 26, 1954

2,667,247

UNITED STATES PATENT OFFICE 2,667,247

POWER AND BRAKE CONTROLLER

Harry C. May, East McKeesport, Pa., assignor to Westinghouse Air Brake Company, Wilmerding, Pa., a corporation of Pennsylvania Original application June 29, 1950, Serial No. 171,078. Divided and this application October 13, 1951, Serial No. 251,225

6 Claims. (Cl. 192—3)

This invention relates to power and brake controllers and more particularly to apparatus for selectively controlling the direction and speed of operation of diesel propulsion engines and also dynamic braking on diesel electric railway locomotives, the present application being a division of my copending application, Serial No. 171,078, filed June 29, 1950.

The principal object of the invention is the provision of a multiple position operator's controller for selectively controlling by electrical means the direction of operation of a prime mover, such as a diesel engine, on a diesel-electric railway locomotive and also for selectively controlling by electrical means the degree of propulsion power exerted by said prime mover or the degree of dynamic braking on said locomotive by combined electrical and pneumatic means.

Another object is the provision of a manually operative controller embodying mechanical means for preventing movement of the control handle into or out of the braking zone without the intervening manual operation of nullifying the effect of said mechanical means.

Another object is the provision of a manually operative controller of the above type embodying manually operable mechanical means for locking said controller in a neutral position in which all electrical circuits through the controller are open, thereby rendering the braking and propulsion equipment inoperative.

Still another object is the provision of a manually operative controller of the above type embodying mechanical means for introducing a delay action for limiting the degree of increase in propulsion power to a preselected amount until a responsive reverse manipulation of the handle is made.

Another object is the provision of a manually operative controller of the above type embodying mechanical means for introducing a delay action for limiting the degree of increase in dynamic braking to a preselected amount until a responsive reverse manipulation of the handle is made.

Other objects and advantages will be apparent from the following more detailed description of the invention.

To attain these objects there is provided a power and brake controller device having a single handle for operating an electrical rotary controller device and a fluid pressure operated self-lapping valve device to control propulsion or braking of a vehicle equipped with said device in either a forward or reverse movement of the vehicle. The handle has a neutral position in which it may be locked manually and from which it may be moved in one direction to a non-operative, or "off," position in a transverse path of manipulation in a zone for controlling propulsion at one side of the latter position and braking in a zone at the other side of the latter position for forward movement of the vehicle. Movement of the handle in the opposite direction from neutral position brings the handle to a non-operative, or "off" position in a transverse path of manipulation for controlling propulsion in a zone at one side of the latter position and braking in a zone at the other side of the latter position for reverse vehicular movement. However, the handle can not be manipulated in either transverse path until the handle has been pulled or shifted outwardly so that the profile of a portion of the handle can match the profile of slots in a cover for guiding the handle in the transverse paths. Nor can the handle be manipulated into or out of the braking zone in either transverse path until a mechanical lock-out mechanism obstructing said paths has been manually withdrawn from said paths. Nor can the handle be manipulated in a power increasing direction in either transverse path for more than a certain distance without a relatively short intervening reverse manipulation of the handle.

Figure 6:
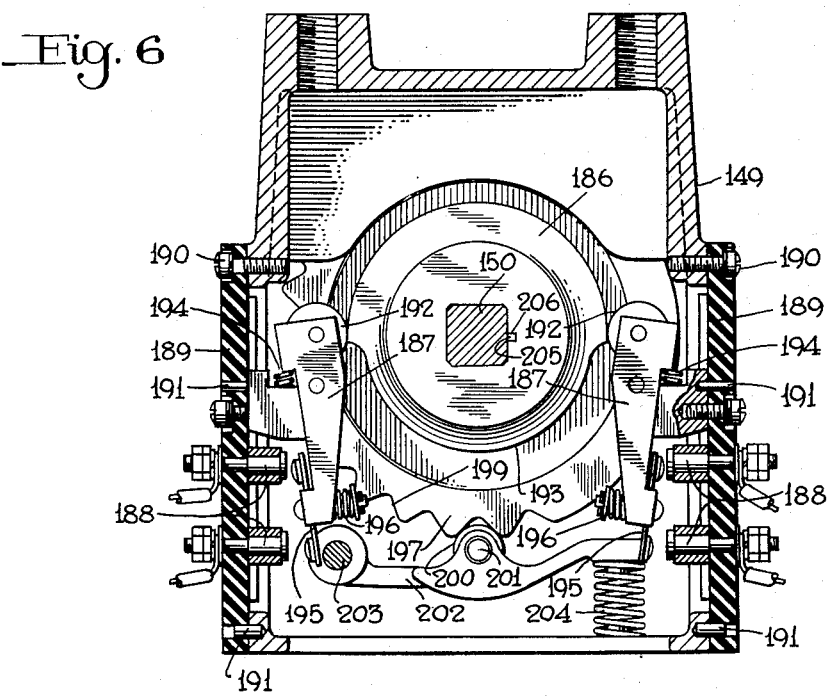
Figure 7:
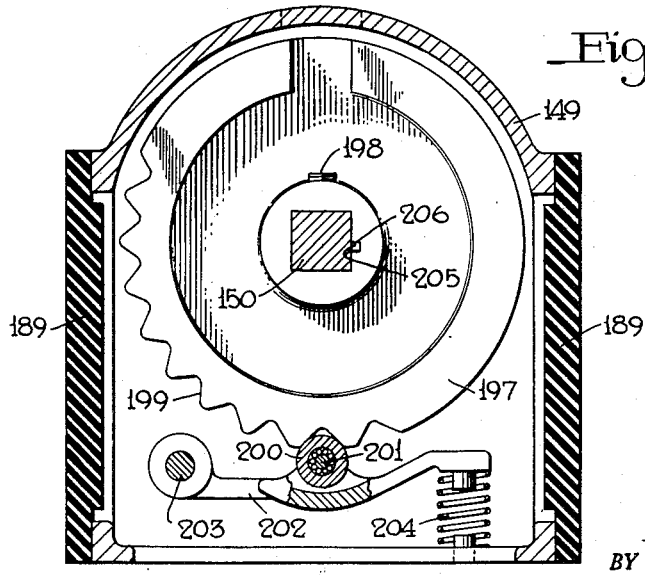

In the accompanying drawings; Fig. 1 is an end view, chiefly in section, of the improved power and brake controller; Figs. 2 and 3 are views, partly in section and partly in outline, taken substantially in the lines 2—2 and 3—3, respectively, in Fig. 1; Fig. 4 is an enlarged sectional view of the portion of the controller shown in outline in Fig. 1; Figs. 5, 6 and 7 are sectional views taken substantially on lines 5—5, 6—6 and 7—7 respectively, in Fig. 4; Figs. 8, 9 and 11 are sectional views taken substantially on lines 8—8, 9—9 and 11—11, respectively, in Fig. 2; and Figs. 10 and 12 are views of the portion of the controller shown in Fig. 9 but with the parts thereof disposed in other positions.

Description

As shown in the drawings, the improved controller or control valve device comprises a bracket or body portion 1 to which is mounted at the top a guide portion 2 by screw-thread means 3, at the bottom a fluid pressure control valve mechanism 4 by screw-thread means 5, and at the side an electrical rotary controller mechanism 6 by screw-thread means 7.

The control valve mechanism 4 comprises a casing 8 containing a flexible diaphragm 9 having at one side a chamber 10 which is open through a restricted port, or choke, 11 to a passage 12, one end of which is connected to a pipe 13. At the opposite side of the diaphragm 9 is a chamber 14, which is open to atmosphere through a port 15. A diaphragm follower 16 contained in chamber 10 and engaging one side of diaphragm 9 has a screw-threaded stud 17 extending through a central opening in the diaphragm into chamber 14. A follower 18 in chamber 14 engages the opposite side of diaphragm 9, and a nut 19 on stud 17 is tightened against the follower 18 and clamps the central portion of said diaphragm between said follower and the follower 16.

The follower 16 has a sleeve-like extension 20 slidably mounted in a bore 21 provided in the casing 8 in coaxial relation with diaphragm 9. Also slidably mounted in this bore beyond the extension 20 is a piston 22 having an operating rod 23 projecting through an opening in the casing 8 to the exterior thereof.

Between the sleeve-like extension 20 and piston 22 is a chamber 24 open to passage 12 and containing a release valve 25 disposed within the sleeve-like extension 20 and arranged to cooperate with a seat provided on the follower 16 around a passage 26 which extends through the stud 17 and opens to chamber 14.

The piston 22 comprises two parts 27 and 28 secured together by screw-thread 29. Each of the piston parts 27 and 28 carries a sealing ring 30 having sliding contact with the wall of bore 21 and said parts cooperate to form exteriorly of the piston an annular chamber 31 between the two sealing rings 30, which chamber 31 is connected by a passage 32 to a fluid pressure supply pipe 33. The sealing rings 30 prevent leakage of fluid under pressure from chamber 31.

The two piston parts 27 and 28 also cooperate to form within the piston 22 a chamber 34 which is open through one or more radial ports 35 to the annular chamber 31. A supply valve 36 contained in chamber 34 is adapted to cooperate with a seat on the piston part 28 for controlling communication between said chamber and a bore 37 extending through the piston part 28 and opening to chamber 24. A stem 38 of smaller diameter than bore 37 is connected at one end to the supply valve 36 and at the opposite end to the release valve 25 whereby said valves are movable in unison. A bias spring 39 in chamber 33 acts on the supply valve 36 urging it toward its seat. A spring 40 in chamber 24 is interposed between the sleeve-like extension 20 and the piston part 28 and is provided to urge the piston 22 in a direction away from the diaphragm 9. The rod 23 is of smaller diameter than piston 22 in order to provide a stop shoulder 41 arranged to be engaged by an overlying shoulder 42 on the casing 8 for limiting outward movement of the piston 22 by spring 40.

Chamber 14 contains a control spring 43, one end of which bears against the diaphragm follower 18. The opposite end of the spring 43 is supported on a follower 44 which in turn is supported by an adjusting screw 45 having screw-threaded engagement with the casing 8. By suitable adjustment of the screw 45 any desired pressure of spring 43 against the diaphragm follower 18 may be obtained.

The upper end of the operating rod 23 engages one end of a lever 46 which is fulcrumed at its other end on a pin 47 carried on an arm 48 projecting from the casing 8. A roller 49 is pivotally mounted on a pin 50 in said lever 46 so as to extend above the surface 51 of the side of the lever opposite the side engaging the rod 23. As will appear later, the roller 49 is arranged to be engaged by a cam member 52 of a lever assemblage 53 so that rotation of the cam member 52 in a certain direction will move the operating rod 23 downward and operate the control valve mechanism 4 to supply fluid under pressure by way of pipe 13 to a fluid pressure motor (not shown) to operate said motor for selectively controlling dynamic braking.

The cam member 52 is mounted on a cylindrical portion or sleeve 54 which is supported by means of a pair of oppositely facing bushings 55 in a casing 56 of the body portion 1 and is provided with a pair of upwardly extending lugs 57 (Fig. 2) between which is rockably mounted adjacent its lower end a control arm 58 by means of a headed screw-thread pin 59 extending through the lugs and secured therein by a nut 60, the arm 58 extending upwardly through the interior of a casing 61, which has secured thereon a guide plate 62, of the guide portion 2.

The lever assemblage 53, of which the cam member 52 and control arm 58 constitute a part, further comprises a sleeve portion 63 arranged to be slidably carried on the arm 58 to carry on its upper end a handle 64 formed of a suitable composition material. Adjacent its upper end, the sleeve portion 63 is provided with a pin 65 which extends transversely to the arm through an elongated opening 66 in the upper end of control arm 58 so as to permit longitudinal movement of the sleeve portion 63 relative to the control arm 58.

Adjacent its lower end, a lateral surface 67 of the sleeve portion 63 is provided with two notches 68 and 69 (Fig. 2), which are adapted to ride under a spring pressed detent 70 and thereby define an upper and a lower position, respectively, of the handle 64 for limiting the speed with which the operator may move the handle 64 from reverse to forward position, or vice versa, as will hereinafter more fully appear. The detent 70 is contained in a cavity 71 of an arm 72 mounted on the control arm 58 by means of a screw 73 so as to lie over the notches 68, 69. A spring 74 is retained in the cavity 71 by means of a cap screw 75 so as to urge the detent 70 into engagement with the arm 58 as previously noted.

The guide plate 62 is provided with a substantially H-shaped slotted opening 76 for guiding the movement of the sleeve portion 63 therein and thereby that of the handle 64. In a cross or horizontal portion 77 of the H-shaped opening 76, as viewed in Fig. 3, there are a pair of oppositely facing lips or ledges 78 which must extend into and register, or match, with the profile of a reduced squared portion 79 of the sleeve portion 63 before the handle 64 can be moved from one end to the other of the portion 77 of slot 76. In this longitudinally located position of the sleeve portion 63 on the arm 58, the detent 70 rests in the notch 69 of the surface 67 on the sleeve portion 63.

As shown in Figs. 1 and 3, the handle 64 may be locked in an operative or neutral position midway in the horizontal portion 77 of the opening 76 by means of a bifurcated lock 80 which may be moved into engagement with the opposite outwardly facing sides 79a of a squared portion of the sleeve portion 63. The lock 80 is mounted on the inner face of the guide plate 62 by means of a headed pin 81 secured in said guide plate and extending through a slotted opening 82 in said lock so as to permit movement of the lock into and out of engagement with the sleeve portion 63. A pin 83 slidably mounted for movement in a transverse direction in a suitable opening in the lock 80 extends through a slotted opening 84 in the guide portion 62 and is provided at its outer end with a button 85 which may rest in a recess 86 at the outer side of opening 84 which positions the lock 80 in an advanced or locking position as shown in Figs. 3 and 11, or in a similar recess 87 which positions the lock in its retracted or unlocked position. The inner end of the pin 85 is provided with a retainer 88 for a spring 89 which urges the button 85 into one or the other of the recesses 86, 87.

There is also mounted in the guide plate 62 a braking lock-out mechanism 90 which comprises a pair of overlapping legs 91, 92, rockably mounted on a plane-surface pad 93a at the inner side of the plate 62 by means of a pin 93. The overlapping portions of legs 91, 92, are provided with openings 94, 95, respectively, each of which may register either fully or in part with the other and through which extends a cam portion 96 of an actuator 97 having an integral handle 98 for rotating the cam portion 96. The actuator 97 is secured in the plate 62 by screw-thread means 99. The legs 91, 92, are provided with opposite and outwardly extending lugs 100, 101, respectively, which are urged to their normal apart position, as shown in Fig. 9, by a spring 102 interposed between and seated in suitable cavities in said legs.

With the braking lock-out mechanism 90 in its normal expanded position as shown in Figs. 2, 3 and 9, the lugs 100, 101 extend into their respective undercut portions 103, 104 (Fig. 1) of slots 105, 106, respectively, of the opening 76 in such a manner as to block movement of the handle 64 into a braking zone, indicated by the markings B, B shown in Fig. 3, for either reverse (marked REV) or forward motion (marked FOR) of the locomotive. When it is desired to effect braking while the locomotive is in motion in either forward or reverse direction the operator may rotate the handle 98 in either direction.

Upon rotating the handle 98 in a clockwise direction, as viewed in Fig. 3, the cam portion 96 will be rotated in the same direction from the position shown in Fig. 9 to the position shown in Fig. 10, thereby moving the lugs 100, 101 of the legs 91, 92, respectively, inwardly to the position shown in Fig. 10 and thus permitting the handle 64 to be actuated into the braking zone. Because of the contour of the outer edges 107, 108, the handle 98 may then be released without interfering with the movement of the handle 64 in the braking zone of slot 105 or 106 until the handle 64 is moved to a position adjacent the non-operative or off position, indicated by markings F—F shown in Fig. 3, at which time either lug 100 will enter a notch 109 in forward braking control, or lug 101 will enter a notch 110 in reverse braking control, as shown in Fig. 11. Movement into neutral position will then be blocked until the handle 98 of the lock-out mechanism 90 is rotated again to retract the lugs 100 and 101 as previously described.

As previously noted, the operator may rock the handle 64 together with the arm 58 in a clockwise or counter-clockwise direction about the pin 59 as viewed in Fig. 1 thereby actuating a yoke, or two-pronged fork, 111 formed at the lower end of said arm in an arc of a circle about the center of the pin 59. The arm 58 extends through and is slidable in an opening 112 in the sleeve 54 and an opening 113 in a plunger 114 slidably mounted in the sleeve 54 so that the yoke 111 engages and overlaps a pin 115 extending diametrically across the opening 113 for operating the plunger toward the left in response to clockwise movement and toward the right upon counter-clockwise movement of the handle 64 as viewed in Fig. 1.

The plunger 114 is provided with a substantially vertical, diametric bore 116 at each side of the opening 113, in which bore is mounted a ball-shaped detent 117 biased downward by a spring 118 operably secured in said bore. When the plunger is disposed at its extreme right-hand position, as viewed in Fig. 1, which is for braking and propulsion control for forward movement of the locomotive, the detents 117 are adapted to seat in a pair of openings 121. When the plunger is actuated from its extreme right-hand position to its extreme left-hand position for propulsion and braking control for reverse motion of the locomotive, the detents 117 rise out of their seats in openings 121 and ride the inner surface of the sleeve 54 to openings 120 where they are then resiliently seated.

Referring in particular now to Fig. 8, it will be seen that there is rotatably mounted by means of pins 122 at opposite sides on the casing 56 of the body portion 1 a pair of oppositely arranged contact arms 123, 124 which are biased by respective springs 125, so as to rock said arms about the pins 122 in opposite directions for maintaining the corresponding ends of each of said contact arms in contact with its respective end of the plunger 114. The ends of the plunger 114 are provided with wearing tips 126, 127 for engagement with wearing tips 128, 129, respectively, which are adjustably mounted in the contact arms 123, 124, respectively.

On the end of each of contact arms 123, 124 opposite the end engaging the plunger 114 there are resiliently mounted on contact bases 130 by means of retainers 131, springs 132 and screw-thread means 133 a pair of bridging contact members 134 and 135, respectively, which are directed inwardly for engaging two pairs of stationary contacts 136 and 137, respectively, mounted on a contact base 138 by screw-thread means 139 which base is in turn mounted on a portion of the casing 56 by screw-thread means 140.

As previously mentioned, when the plunger 114 is shifted to the right upon movement of handle 64 to the left as viewed in Fig. 1 the upper and lower pairs of contacts 137 are bridged by the corresponding upper and lower contact members 135 (Fig. 8) to energize circuits for selective control of braking or propulsion forward movement of the locomotive by maneuvering the handle 64 in the slot 105 of the opening 76. Conversely, to effect selective control of braking or propulsion during reverse movement of the locomotive the handle 64 is moved to the right, as viewed in Fig. 1, and the plunger 114 is shifted to the left thereby causing the upper pair and lower pair of contacts 136 to be bridged by upper and lower contact members 134 for energizing the proper circuits for control of braking or propulsion for reverse movement of the locomotive by maneuvering the handle 64 in the slot 106 of the opening 76.

A gear segment 141 (Fig. 1) is rotatably mounted on the sleeve 54 and rigidly secured by means of a pin 142 to the cam member 52 for rocking motion in unison therewith, the gear segment being provided at the bottom with teeth 143 for operatively engaging corresponding teeth 144 in a pinion 145 which is rigidly mounted on one end of an operating shaft 146 extending into and forming a part of the rotary controller mechanism 6. An operative connection between the pinion 145 and shaft 146 is effected by means of a semi-circular key 147 and a set-screw 148 mounted in suitable openings in the pinion and shaft. A pin 148a is mounted in the cam member 52 and registers with an opening 145a in the pinion 145 when gear segment 141 and pinion 145 are in their proper positions relative to each other.

The rotary controller mechanism 6 comprises a casing 149 having the driving shaft 146 and a controller operating shaft 150 rotatably mounted in coaxial alignment therein by means of a pair of bearings 151 and a pair of bearings 152, 184, respectively. On the end of the operating shaft 146 opposite that on which the pinion 145 is mounted there is rigidly mounted by means of a key 153 an arm 154 extending radially outward from said shaft. Rigidly mounted to the outer end of the arm 154 is a pin 155 extending in a direction away from said arm and parallel to the axis of the driving shaft 146 to make an operative connection with a stepping or latching mechanism 156. At one end of shaft 146 a bearing washer 157 is mounted between the casing 149 and pinion 145 while at the other end a similar bearing washer 157a is located on the other end of the shaft between the casing and the arm 154.

As shown in Figs. 4 and 5 of the drawings, the stepping mechanism 156 comprises an annular portion or rack 158 fixedly mounted in a portion of the casing 149 and having on its inner periphery a row of teeth 159 for detaining engagement with a pawl 160 to restrict the rate of increase in propulsion to a step-by-step change in propulsion control. The annular portion 158 is also provided on its inner periphery with teeth 161 for engagement with a pawl 162 for restricting the rate of increase of braking power at certain stages. The pawl 160 comprises an arm 163 extending towards the teeth 159 and is provided at the base of said arm with an opening 164 through which a pin 165, mounted in a carrier member 166, extends for supporting said pawl, the opening 164 being elongated in the direction of the arm 163 so as to permit rocking and shifting movement of the pawl relative to the pin and vice versa, for a purpose to be more fully explained later. The pawl 160 further comprises an arm 167 extending substantially radially from opening 164 at an angle to the arm 163 and adapted to make contact with a pin 168 secured in one end of an actuating element or link 169 for controlling the movement of the pawl 160 relative to the carrier member 166 and to the rack 158. Interposed between the arm 167 and a portion 166a of the carrier member 166 is a spring 170 which biases the pawl 160 in a direction for engaging the teeth 159 and the pin 168.

The pawl 162 comprises an arm 171 extending towards the teeth 161 and is provided at the base of said arm with an opening 172 (Fig. 4) through which the pin 165 likewise extends for supporting the pawl, the opening 172 being elongated in the direction of the arm 171 for similar purposes to that of pawl 160. The pawl 162 further comprises an arm 173 extending radially at an angle to the arm 171 and adapted to make contact with the pin 168 at the side opposite to that of arm 167 of pawl 160. A spring 174 similar to spring 170 is interposed between the arm 173 and another portion 166c of the carrier member 166, which spring biases the pawl 162 in a direction for engaging the teeth 161 and the pin 168.

The carrier member 166 (Figs. 4 and 5), constituting a part of the stepping mechanism 156, is rigidly secured to the controller operating shaft 150 by means of a set-screw 175 and a semi-circular key 176. The downwardly extending portion 177 of the carrier member 166 through which the pin 165 extends is bifurcated and intermediate the pin 165 and shaft 150 is provided with a pair of matched elongated openings 177a (Fig. 4) extending in a direction substantially parallel to that of the openings 164 and 172 in the pawls 160 and 162, respectively. In an upwardly extending arm 178 of member 166 diametrically opposite to the bifurcated portion 177 there is provided a ball bearing 179 for reception of a pin 180 secured at either end in the actuating element or link 169 for rockably supporting said link.

The link 169 is provided at the top (Fig. 5) with a round-bottomed channel 181 which accommodates pin 155 in close-fitting engagement, the pin, as has been noted, being rigidly secured to the outer end of the arm 154. The link 169 is formed in the shape of a bow, substantially bridging the shaft 150 with one end mounted on pin 180 and with the opposite end carrying the pin 168, at the side of shaft 150 adjacent the pin 165. The link 169 has two matching parallel sides which slidably engage two opposite outer surfaces of the arm 178 of the carrier member 166 and are journaled on the pin 180, while at the opposite side of shaft 150 said sides are disposed on at either side of arm 177 of member 166 and carry the pin 165.

As shown in Fig. 4 and above described, the controller operating shaft 150 is rotatably supported adjacent its one end in the bearing 152 mounted in a suitable opening in a wall 183 of the casing 149 and at its other end is supported in a bearing 184 mounted in a suitable opening in an outer wall 185 of casing 159. Intermediate its ends the shaft 150 is of squared cross-section, having mounted thereon in interlocked relation a plurality of rotary cams 186 having central openings of squared shape corresponding to the cross-section of the operating shaft. Each cam 186 is adapted to operate a pair of oppositely arranged contact fingers 187 into and out of contact with respective fixed contact members 188 (Fig. 6) according to the contour of the rotary cam. The contact fingers 187 at each side of the plurality of cams 186 are hinged, in spaced substantially parallel relation to each other, to a supporting board 189 of insulating material secured to the casing 149 by means of headed screws 190 in positions determined by dowel-pins 191.

As will be seen in Fig. 6, each contact finger 187 is provided at one end with a roller 192 that engages the peripheral edge of the respective rotary cam 186. When one of the rollers 192 engages in a depressed portion 193 of the peripheral edge of the cam 186, a spring 194 becomes effective to actuate the contact finger 187 into contact with the respective pair of the fixed contact members 188. When the roller 192 engages the outer rim or edge of the cam 186, the respective finger 187 is shifted out of contact with the respective fixed contact members 188. A yielding contact tip 195 having an associated bias spring 196 is provided on each contact finger 187 in the manner shown so that the contact tip may close a circuit between the respective pair of fixed contact members 188 without the necessity of electric current passing through the contact finger 187 itself.

The specific contour of the rotary cams 186 and the relative angular position of one to the other is such that the contact fingers 187 are actuated into and out of bridging contact with the respective stationary contact members 188 in the proper sequence in connection with manipulation of the handle 64 to provide the desired propulsion or braking control in either a forward or reverse direction of motion of the locomotive.

The various operating positions of the controller shaft 150, and consequently of the rotary cams 186 and the carrier member 166 secured thereto, are positively defined by means of a disc 197 (see Figs. 6 and 7) fixed to a squared portion of the shaft by means of a set-screw 198 and having suitable notches 199 in the peripheral edge thereof for receiving a roller 200, which roller is rotatably mounted by means of a bearing 201 on a lever 202 and yieldably biased into contact with the peripheral edge of the disc 197 by a spring 204. The lever 202 is pivoted at one end on a suitable stud 203 secured in the casing 149 in parallel relation to the controller shaft 150, and is operatively engaged at the other end by the coil spring 204 interposed between a wall of the casing 149 and the lever end.

In order to insure the disc 197 being fitted over the operating shaft 150 in one position only, a pin 205 is provided in a side of said shaft 150 which extends into a suitable groove or slot 206 formed in the central opening of the disc 197. Thus the disc is prevented from being installed in improper angular relation to the controller shaft 150.

*Operation*

In operation, let it be assumed that a locomotive equipped with a controller apparatus embodying the invention is stationary and that it is conditioned for operation under the control of this controller apparatus, the handle 29 and other parts of which are positioned as shown in Figs. 1, 2 and 3 of the drawings. The button 85 being seated in recess 86 as shown, the lock 80 is in a position to prevent movement of the lever assemblage 53, and thereby handle 64, out of the "neutral" position midway in the cross-slot section 77 and the braking lock-out mechanism 90 is in a position to prevent undesired movement of the lever assemblage 53 into a braking zone for either forward or reverse movement of the locomotive. The electrical circuits through the forward contacts 137 and reverse contacts 136 are open as best seen in Fig. 8 and all the contacts in the drum controller mechanism 6 are open. In the self-lapping control valve mechanism 4 the adjusting screw 45 is positioned to maintain fluid under pressure at a certain desired minimum degree in the delivery pipe 33 and consequently valve 25 is in seating engagement with diaphragm follower 16 and supply valve 36 is in seating engagement with the part 28 of the piston 22.

Now, when the operator wishes to propel the locomotive in a forward direction he may pull the button 85 out of the recess 86 against the force of the spring 89 and move the button into the recess 87 where the spring 89 will hold it, thereby moving the lock 80 out of the line of motion of the lever assemblage 53 in the slot section 77. The handle 64 together with sleeve portion 63 of the lever assemblage 53 are then moved to the left in the slot section 77, as viewed in Fig. 3, toward the slot 105. When the left-hand extremity of the slot section 77 is reached by the sleeve portion 63, the sleeve portion 63 is clear of the lips 78 and may then be moved outwardly by the handle 64, sliding the sleeve portion on the control arm 58 and under the detent 70 (Fig. 2) until the detent rests in notch 68 instead of notch 69 in the sleeve portion and at the same time carrying the pin 65 (Fig. 1) to its extreme upper position in opening 66. In this position of the handle the reduced portion 79 registers with a ledge or lip 207 around the rim of the slot 105 so that the handle 64, as viewed in Fig. 1, may now be guided for longitudinal movement in the slot 105 but not transversely in the slot section 77.

As the handle 64 is moved from the neutral position to the left (Fig. 3) as just described, the lever assemblage 53 is rocked in a counter-clockwise direction, as viewed in Fig. 1, about the pin 59 causing the plunger 114 to be shifted to the right by reason of its connection with lever assemblage 53 through the medium of the fork 111 thereof and the pin 115 in the plunger. In shifting to the right the plunger 114 actuates the contact arm 124 in a clockwise direction, as viewed in Fig. 8, against the pressure of bias spring 125, bringing the contact member 135 into engagement with the stationary contacts 137 and thereby establishing electrical circuits with a reverser and sanding mechanism on the locomotive, which mechanism is not a part of this invention and therefore not shown. The ball detents 117 contained in the plunger 114 will register with the openings 121 and as a result of pressure exerted by springs 118 will resist movement of said plunger out of the position just assumed.

With lever assemblage 53 operatively disposed in the slot 105 by pulling the handle 64 to its extreme outer position and the operator wishing to effect forward propulsion of the locomotive, he may move the handle 64 to the right as viewed in Fig. 2 which corresponds to upward movement of the shaft assemblage 53 as shown in Fig. 3. This movement of handle 64 effects clockwise movement of the lever assemblage 53 (Fig. 2) cam member 52 and gear segment 141 about sleeve 54. Since the teeth 143 of the gear segment 42 are in mesh with the teeth 144 of the pinion 145, clockwise rotation of the cam member 52 effects counter-clockwise rotation (Fig. 1) of the pinion 145 and the shaft 146 rigidly connected thereto, which movement corresponds to clockwise rotation of the shaft 146 as viewed in Fig. 5.

It will be noted upon referring to Fig. 7 that shaft 150 and therefore carrier member 166 fixed thereon, are held temporarily stationary by the yieldable engagement of roller 200 with a notch 199 in disc 197 which disc is likewise fixed to shaft 150.

The shaft 146 acts through the medium of the attached arm 154 and pin 155 upon the upper end of link 169 to rock the link in a clockwise direction, as viewed in Fig. 5 about the pin 180 mounted in carrier member 166, moving the pin 168 secured in the lower end of the link against the pressure of bias spring 174 acting on arm 173 of pawl 162, into contact with the left-hand ends of the openings 177a in the lower portion 177 of the now stationary carrier member 166. This motion of pin 168 relative to carrier member 166 permits spring 170 to shift pawl 160 toward the left until the pawl at the right-hand end of the opening 164 engages the right-hand side of pin 165 and thereafter urges the pawl to rotate counterclockwise about pin 165 and toward engagement with rack 158. Further clockwise movement of the link 169 causes rotation of member 166 in the same direction, carrying the pawl 160 to the left along the inner periphery of the annular rack 158 until arm 163 of pawl 160 engages the first of the teeth 159.

During the preceding action the disc 197 which is fixed to the shaft 150, is rotated in a counter-clockwise direction, as viewed in Fig. 7, causing the roller 200 to ride outward on the hump between the first notch 199 and notch 199 immediately to the left against the pressure of spring 204 acting on lever 202. After the pawl 160 passes the halfway point in its travel toward the first tooth 159, the roller is past the peak of said hump and spring 204 then actuates the roller inward to the bottom of the next notch 199, thereby causing the shaft 150 and member 166 to complete the first step of rotation in a direction for increasing propulsion power. This movement of member 166 is sufficient to carry pin 165 to the left-hand end of opening 164 in pawl 160 and also increase the force of spring 170 acting on said pawl by further compressing the spring between portion 166a and the pawl. At this time all the motion just described, including that of the handle 64 is interrupted.

During the operation just described, the disc 197, being rigidly secured to the shaft 150, is rotated through the same angle as the cam members 186 which is sufficient to locate the second notch 199 from the right hand (Fig. 7) above the spring-pressed roller 200 by which the shaft is held stationary while the operation now about to be described takes place.

As has just been noted, the rotation of shaft 150 is slightly out of phase with rotation of shaft 146 due to the lost motion connection between link 169 and carrier member 166 until they are in phase at the end of the first step of propulsion increase. However, at the end of first step of rotation of shaft 150 the pressure of opposing springs 170 and 174 is unbalanced in a direction for shifting the pawls to the left, due to the lost motion connection between the carrier member 166 and the pawls.

At this time, in order to further increase the propulsion power the operator must now reverse the motion of the handle 64 a sufficient distance to disengage the pawl 160 from the first tooth 159 before the pawl may be advanced to the second tooth 159 and the handle 64 advanced to marking "2" on the guide plate 62 in the forward propulsion zone. Counter-clockwise movement of handle 64 as seen in Fig. 2 effects similar movement in the shaft 146 and arm 154 attached thereto in a manner just the reverse of that previously described. The resulting counter-clockwise movement of the link 169 relative to the now stationary shaft 150 and member 166 causes pin 168 to rock pawl 160 in a clockwise direction about pin 165, which is now disposed at the left-hand end of opening 164, moving the outer end of arm 164 inward until it is clear radially of the apex of the first tooth 159, whereupon spring 170 prevails over spring 174 and propels said pawl end past the first tooth into a position from which it may be actuated into engagement with the second tooth. The various parts of the stepping mechanism 156 are now in the same position relative to each other as those shown in Fig. 5, but, displaced angularly to positions adjacent the first of teeth 159.

Upon resuming clockwise movement of the handle 64 (Fig. 2) the corresponding initial movement of shaft 146 and link 169 in a clockwise direction (Fig. 5) carries the pin 168 toward the left away from arm 167 of the pawl 160, thereby permitting spring 170 to shift the pawl 160 to the left and to rotate it counter-clockwise on pin 165 into position for repeating the operation described in connection with the pawl 160 engaging the first tooth. With pin 165 disposed at the right-hand end of opening 164 and pin 168 disposed at the left-hand end of openings 177a, the link 169 rotates the member 166 clockwise, which member carries the pawl 160 into collision with the second tooth 159 and then moves pin 165 to the left-hand end of opening 164 and further compresses spring 170. At this time, roller 200 will be resting in the next notch 199 to the left (Fig. 7) in disc 197. Upon reverse motion of link 169, pin 168 rotates pawl 160 out of engagement with second tooth 159, whereupon over-energized spring 170 projects the pawl past the apex of the second tooth.

This stepping operation may be repeated until the desired degree of propulsion power is obtained, or until, at position marking "8," the handle 64 is in position for effecting maximum propulsion power.

When it is desired to reduce the degree of propulsion power, the handle 64 may be moved toward the marking "FOR" on guide plate 62 which is opposite to that just described.

In the return movement, however, there will be no stepping, or latching, interruptions, since the contours of the teeth 159 are such as to permit the pawls 160 and 162 to ride over the teeth without operatively engaging them.

It being understood that the peripheral surfaces of the cams 186 are formed in such contour and relative position as to control the operation of the contact fingers 186 in the opening and closing of certain of the electrical circuits through the various stationary contacts 188 in the proper sequence to effect the desired propulsion control, it is deemed that the specific function of the contact fingers 187 is unnecessary to a clear understanding of the present invention.

Movement of the control lever assemblage 53 in the forward slot 105 from the propulsion zone past the slot 77 into the braking zone is prevented by the lug 100 of the leg 91 in the lock-out mechanism 90 extending into the undercut portion 103 of the slot 105. If the operator desires to brake the locomotive while moving forward, he may turn the handle 98 either in a clockwise or counter-clockwise direction as viewed in Fig. 3, which results in rotating the integral cam portion 96 the same direction. The cam portion 96 acts in the openings 94 and 95 to draw the respective legs 91 and 92 inwardly from the position shown in Fig. 9 to the position shown in Fig. 10. In the latter position the handle 64 and lever assemblage 53 may be advanced to the left in slot 105 as viewed in Fig. 2, corresponding to downward movement in slot 105 as viewed in Fig. 3, into the braking zone for forward motion. Movement of the handle 64 in this direction actuates the link 169 and thereby the pawl 162 in a counter-clockwise direction as viewed in Fig. 5 in a manner similar to that described in connection with propulsion control operation. The pawl 162 continues moving in a counter-clockwise direction until the tip of the arm 171 engages the first of the teeth 161, thereby interrupting movement of handle 64.

As previously described in connection with controlling propulsion, the controller shaft 150 will be held stationary by the positioning action of the roller 200 in the extreme right-hand notch 199 of the disc 197. The handle 64 may then be moved in reverse toward the slot 77 and thereby the link 169 may be moved in a clockwise direction as viewed in Fig. 5 which, due to a lost-motion action between pawl 162 and member 166, and between said member and link 169, similar to that described between pawl 160 and the link, over-energizes spring 174 causing the tip of the arm 171 to be drawn radially inward from the rack 158 until the arm 171 clears the apex of the tooth 161 and spring 174 propels said arm past said tooth. Following this, further advancement of the handle into the braking zone with a consequent proportional increase in braking power may be continued until the pawl 162 engages, or collides with, the second tooth 161. At this point, the associated equipment is conditioned to provide maximum braking power and further advancement of the handle is prevented by the last mentioned engagement.

Considering now the cam member 52, a portion 208 of the cam member is formed in a segment of a circular disc, the periphery of which is adapted to be abutted by the roller 49 when the handle 64 is manipulated in the propulsion zone. Consequently, the roller 49 and lever 46 in which it is mounted will remain stationary relative to the control valve mechanism 4 and therefore said valve mechanism will not be active in, or participate in, obtaining propulsion control.

Another portion 209 of the cam member 52 is provided with a peripheral surface in the form of a cam or inclined surface 210 adapted to be engaged by roller 49. The surface 210 is such that as the roller 49 rides on the surface 210 upon manipulation of the handle in the braking zone the roller is displaced vertically downward causing the arm 46 to rotate clockwise about the pin 47 and to displace the operating rod 23 of the valve mechanism 4 an amount corresponding to the position of the handle 64 in the braking zone.

It is preferred that a minimum fluid pressure of approximately ten pounds be maintained in pipe 13, and so therefore the various parts of the self-lapping control valve mechanism 4 will be disposed as shown in Fig. 1, in which release valve 25 is seated on diaphragm follower 16 and supply valve 36 is seated on piston 22. The initial pressure in pipe 13 may be determined by adjusting the force exerted by regulating spring 43 by means of the adjusting screw 45, which determines the opposing fluid pressure in chamber 10, which is connected to pipe 13.

As the operator advances the spring follower 44 inward by rotating the adjusting screw 45 the spring actuates diaphragm 9 and follower 16 upwardly and, through the medium of release valve 25 and connecting stem 38, unseats supply valve 36 against the opposing pressure of bias spring 39, the piston 24 being held stationary by operating rod 23. Fluid under pressure then flows from supply chamber 34, past valve 36 into delivery chamber 24, whence it flows through passage 12 to pipe 13, and to restricted port 11 leading to chamber 10. When the pressure of fluid thus supplied to chamber 10 acting on diaphragm 9 becomes sufficient to preponderate over the force of spring 43, the diaphragm 9 will deflect downwardly, thereby permitting spring 39 to return supply valve 36 to its seat. Thus, screw 45 may be adjusted so that the desired initial 10 pounds pressure is obtained in pipe 13.

As the operator advances the handle 64 in the braking zone to increase the braking power, the cam member 52 is rotated in a counter-clockwise direction about the axis of the plunger 114 and sleeve 54, causing the surface 210 of the cam member 209 to traverse the roller 49 and actuate same vertically downward, rotating the arm 46 clockwise about the pin 47, and actuating the piston 22 in the direction of the diaphragm 9. With the release valve 25 seated against the diaphragm follower 16, this movement will be relative to said valve and also to the connected supply valve 36, so that fluid under pressure, supplied to supply chamber 31 by way of pipe 33, passage 32, chamber 31 and ports 35, will flow past valve 36 to delivery chamber 24. Fluid under pressure thus delivered to chamber 24 will flow therefrom through pipe 13 to a fluid pressure operated actuator mechanism for a drum controller of dynamic braking circuits, all of which is not shown, since it does not constitute nor is it claimed as a part of the present invention. Fluid under pressure thus provided in piston chamber 24 will also be effective in chamber 10 through passage 12 and restricted port 11 on diaphragm 9 so as to deflect said diaphragm against spring 43 as the pressure of said fluid is increased. This deflection of diaphragm 9 against spring 43 will permit movement of the release and supply valves, 25 and 36, respectively, with said diaphragm relative to the piston 22 whereby, immediately after opening of the supply valve 41, said diaphragm will start to move substantially with the piston 22, and said valve will remain unseated as long as the piston continues to move. When the increase in pressure of fluid in piston chamber 24 and in chamber 10 acting on diaphragm 9 is sufficient to permit the closing of the supply valve 36 by spring 39, further flow of fluid under pressure to said chambers will be prevented and the movement of said diaphragm will cease. Thus, the degree of pressure of fluid supplied to delivery pipe 13 and to the brake operating apparatus not shown, and therefore the degree of brake application, will be in proportion to the degree of displacement of the handle 64 from the "off" position adjacent slot 77 into the brake zone past marking "B" on the guide plate 62 (Figs. 2 and 3).

When the operator wishes to reduce the braking power of, or release the brakes on the locomotive, he may actuate the handle 64 in a clockwise direction toward "off" position, which action will permit the spring 40 to actuate the piston 22 in a direction away from the diaphragm 9 and follower 16, whereupon fluid under pressure will be released from diaphragm chamber 10. As the pressure of fluid in chamber 10 is reduced, spring 43 will deflect diaphragm 9 in a direction toward release valve 25, but said valve will remain unseated as long as the piston 22 is moving in a direction toward arm 46 and cam member 52 and thus away from said diaphragm. If movement of handle 64 in a clockwise direction is stopped before full release position of the handle is attained, the release valve 25 will be seated, thereby retaining a corresponding portion of the former fluid pressure in chamber 10. If the handle is moved all the way to "off" position, the valves will assume the positions shown in Fig. 1 of the drawings, in which a minimum of approximately 10 pounds pressure will be retained in the diaphragm chamber 10.

It will be remembered that, when the handle 98 of the lock-out mechanism 90 was released after the handle 64 and sleeve portion 63 passed into the braking zone, the legs 91 and 92 assumed under the influence of spring 102 the positions shown in Figs. 9 and 12 in which the lugs 100 and 101 of legs 91 and 92, respectively, project into the path of the sleeve portion 63. Consequently, when the handle is following the guide slot 105 for forward motion of the locomotive and is nearing the "off" position the sleeve portion 63, to which the handle is attached, will collide with lug 100 disposed in a notch 109 in said sleeve portion. Upon rotation of the handle 98 in either direction the legs 91 and 92 will be retracted to the position in which they are shown in Fig. 10, whereupon, the handle 46 may be returned to "off" position adjacent the slot 77.

From this position the handle 46 may be manipulated to and locked in "neutral" position in which all contacts are open by pushing the handle inwardly to a position in which detent 70 rests in the notch 69 in sleeve portion 63, in which position the reduced portion 79 of said sleeve portion registers with ledges 78 in guide plate 62, and then the handle may be moved to a mid-point in the slot 77. In this position button 85 may be pulled out of recess 87 and moved along opening 84 to recess 86 and released for resting therein. In this position of button 85 lock 80 is in the position shown in Fig. 11, in which position the sleeve portion 63 and handle 64 are locked against movement in any direction.

If it is desired to control movement of the locomotive in a reverse direction, the handle 64 may be moved toward the marking "REV" on the guide plate 62, after which the handle may be pulled outward until the reduced portion 79 registers with a ledge or lip 211 on the rim of the slot 106. In this position the stationary contacts 136 are bridged by the contact members 134, thus establishing circuits for use in propulsion and braking for motion in a reverse direction of the locomotive. For effecting propulsion the handle may be manipulated in the propulsion zone and the cams 186 will be actuated in the same manner as that described in connection with propulsion in a forward direction. Likewise, braking of motion in a reverse direction may be controlled in the same manner as that described in connection with braking in a forward direction, also requiring the same manipulation of handle 98 as above.

*Summary*

It will thus be seen that I have provided a combined braking and propulsion controller for controlling by manipulation of a single handle the braking and propulsion of a diesel locomotive in either a forward or reverse direction. The controller is further provided with several novel detaining means for preventing undesired movement of the handle out of "neutral" and "off" positions and for preventing manipulation of the handle in an undesirably hasty manner.

Having now described my invention, what I claim as new and desire to secure by Letters Patent, is:

1. A vehicle power and brake controller device comprising an operating shaft having a neutral position and rotatable in one zone out of said neutral position to control propulsion power and out of said neutral position in another zone to control braking power, a plurality of switch devices operative to open or closed position in accordance with the rotary position of said shaft, actuating means comprising a single handle for rotating said shaft in either zone, means obstructing movement of said handle between a neutral position and a brake controlling position, manual means for nullifying said obstructing means, stepping means interposed between said actuating means and said shaft for limiting continuous rotation of said shaft in either of said zones to a series of steps, a braking control pipe, a self-lapping valve device operable by said handle when the handle rotates the shaft in said other zone to vary the pressure of fluid in said braking control pipe, and selector means comprising an element shiftable by said handle to one position to establish electrical circuits to be controlled during rotation of said shaft in said one direction and shiftable to another position to establish electrical circuits to be controlled during rotation of said shaft in said opposite direction.

2. A vehicle power and brake controller device comprising a rotary operating shaft, a plurality of switch devices operative to open or closed positions in accordance with the rotary poisition of said shaft, actuating means comprising a single handle having a neutral position and movable therefrom in one direction to an off position for manipulation of the handle in a path for controlling forward motion of the vehicle and movable therefrom in the opposite direction to an off position for manipulation of the handle in a path for controlling reverse motion of the vehicle, locking means having one position for permitting manipulation of said handle in either of said paths and manually operative to another position for permitting movement of said handle between off position in the path for controlling forward motion of the vehicle to off position for controlling reverse motion of the vehicle, detent means having a normal position for preventing movement of said handle between a brake controlling position and an off position in either path and manually operable to a nullified position, stepping means interposed between said actuating means and said shaft for limiting continuous movement of said handle and said shaft in either a power control path or brake control path, a brake control pipe, a self-lapping valve device operable by said handle when the handle is manipulated in a brake control path to vary the pressure of fluid in said brake control pipe in accordance with the position of said handle, and selector means comprising an element shiftable by said handle to the off position in either of said paths to establish electrical circuits to be controlled by manipulation of the handle in either path.

3. A vehicle power and brake controller device comprising a rotary operating shaft having a non-operative position with a power control zone of rotation at one side of said position and a brake control zone of rotation at the opposite side of said position, a plurality of switch devices operative to open or closed position in accordance with the rotary position of said shaft, actuating means comprising a handle for rotating said shaft in either of said zones, means for confining manipulation of said handle to a path for rotating said shaft through said zones and said non-operative position, and locking means interposed in said path and normally preventing manipulation of said handle for corresponding rotation of said shaft between said non-operative position and said brake control zone, said locking means being resiliently movable to a position for rendering said locking means ineffective.

4. A vehicle power and brake controller device comprising a rotary operating shaft having a non-operative position with a power control zone of rotation at one side of said position and a brake control zone of rotation at the opposite side of said position, a plurality of switch devices operative to open or closed position in accordance with the rotary position of said shaft, actuating means comprising a handle for rotating said shaft in either of said zones, means for confining manipulation of said handle to a path for rotating said shaft through said zones and said non-operative position, and locking means interposed in said path normally preventing manipulation of said handle for corresponding rotation of shaft into and out of said brake control zone and resiliently operable to be rendered ineffective.

5. A power and brake controller device for controlling movement of a vehicle in either one of two opposite directions, in combination, a rotary operating shaft having a non-operative position with a power control zone of rotation at one side of said position and a brake control zone of rotation at the other side of said position, a plurality of switch devices operative to open or closed position in accordance with the rotary position of said shaft, actuating means comprising a handle for rotating said shaft in either zone and a sleeve slidably mounted on said handle for relative longitudinal movement, a portion of said sleeve having a particular profile, a guide plate having a first slot for guiding movement of said handle in the control zone for one direction of vehicular movement, a second slot for guiding movement of said handle in the control zone for the opposite direction of vehicular movement and a slot connecting said first and second slots for guiding movement of the handle between said slots when said shaft is in said non-operative position, each of said slots having a profile for matching said particular profile on said sleeve for permitting handle movement in the respective slot and the elevation of the profile in said third slot being different from that of the profile of the other two slots.

6. A power and brake controller device for controlling movement of a vehicle in either one of two opposite directions, comprising in combination, a rotary operating shaft having a non-operative position with a power control zone of rotation at one side of said position and a brake control zone of rotation at the other side of said position, a plurality of switch devices operative to open or closed position in accordance with the rotary position of said shaft, actuating means comprising a driving shaft and a handle for rotating said operating shaft in either zone, a guide plate having a slot through which said handle extends for guiding manipulation of said handle in one path for control of movement of the vehicle in a forward direction, a second path for control of movement of the vehicle in a reverse direction and a third path connecting said first and second paths at a point corresponding to non-operative position of said shaft, means interlocking said handle with said guide plate for delaying movement between two connecting paths, said interlocking means requiring manual adjustment of said handle before the latter movement may be effected, a brake control pipe, a self-lapping valve device operable by said driving shaft when said handle is manipulated in a brake control zone to vary the fluid pressure in said brake control pipe in accordance with the position of said driving shaft, lock-out means having a normal position for preventing movement of both of said shafts by said handle into or out of the brake control zone and manually operative to a nullified position, and stepping means interposed between said operating shaft and said actuating means for interrupting continuous movement of said shaft and said actuating means correspondingly in said brake control zone and said power control zone.

HARRY C. MAY.

References Cited in the file of this patent

UNITED STATES PATENTS

| Number | Name | Date |
| --- | --- | --- |
| 2,464,998 | Stevens | Mar. 22, 1949 |
| 2,477,836 | Stevens | Aug. 2, 1949 |
| 2,540,427 | Charles et al. | Feb. 6, 1951 |